United States Patent [19]
Sato

[11] Patent Number: 5,331,467
[45] Date of Patent: Jul. 19, 1994

[54] REFLEX LENS SYSTEM HAVING THE ANTIVIBRATION FUNCTION

[75] Inventor: Susumu Sato, Chiba, Japan
[73] Assignee: Nikon Corporation, Tokyo, Japan
[21] Appl. No.: 837,954
[22] Filed: Feb. 20, 1992

[30] Foreign Application Priority Data
Feb. 25, 1991 [JP] Japan ................... 3-29810

[51] Int. Cl.$^5$ .................. G02B 17/00; G02B 27/64
[52] U.S. Cl. ................... 359/731; 359/366; 359/557
[58] Field of Search ................ 359/726–736, 359/554–557, 364–366

[56] References Cited
U.S. PATENT DOCUMENTS
4,666,259 5/1987 Iizuka ................... 359/731
4,907,868 3/1990 Kitagishi et al. ............ 359/554
4,971,428 11/1990 Moskovich ............. 359/731

FOREIGN PATENT DOCUMENTS
61-39015 2/1986 Japan .................. 359/727

*Primary Examiner*—Scott J. Sugarman
*Assistant Examiner*—James Phan
*Attorney, Agent, or Firm*—Shapiro and Shapiro

[57] ABSTRACT

An antivibration reflex lens provided with an antivibration correcting optical system is of a two-group construction having a first lens group which is a substantially afocal system having a forward unit of positive refractive power and a rearward unit of negative refractive power, and a second lens group of positive refractive power. The forward unit in the first lens group has, in order of light incidence, a concave reflecting surface and a convex reflecting surface. The rearward unit is a lens unit having negative refractive power, and focusing is effected by this lens unit. Further, the whole or part of the second lens group is displaceable across the optical axis to thereby effect antivibration correction.

9 Claims, 3 Drawing Sheets

$$\frac{f_{11} \cdot f_2}{|f_{12}| \cdot F} = 1$$

$$\frac{f_{11} \cdot f_2}{|f_{12}| \cdot F} < 0.7$$

$$1.3 < \frac{f_{11} \cdot f_2}{|f_{12}| \cdot F}$$

REFLEX LENS SYSTEM HAVING THE ANTIVIBRATION FUNCTION

BACKGROUND OF THE INVENTION

1. Field of the Invention

This invention relates to an interchangeable lens for a single-lens reflex camera or an electronic still camera.

2. Related Background Art

Heretofore as in the refraction type telephoto lens described in U.S. Pat. No. 4,907,868, aberration correction has been effected by a first lens unit and a second lens unit, and in the other cases, only a single lens unit is used for aberration correction. These units are moved perpendicularly to the optical axis to thereby effect antivibration.

SUMMARY OF THE INVENTION

In the prior art as described above, the full length of the lens has become great with an increase in the number of constituent lens elements, and this has led to a tendency toward a greater weight of the lens. So, the present invention has as its object the provision of an antivibration lens of short overall length.

For the solution of the above-noted problem, the antivibration lens of the present invention comprises, in order of light incidence, a first lens group G1 having a positive forward unit and a negative rearward unit and constituting as a whole a substantially afocal system, and a second lens group G2 of positive refractive power, the first lens group G1 having, in order of light incidence, a concave reflecting surface R1 and a convex reflecting surface R2, and the whole or part of the second lens unit G2 of positive refractive power being displaceable across the optical axis to thereby make antivibration possible.

As will be more fully explained later, the lens of the present invention preferably satisfies the following expression (1):

$$0.7 < (f_{11} \cdot f_2)/(|f_{12}| \cdot F) < 1.3 \quad (1)$$

where $f_{11}$ is the focal length of the forward unit, $f_{12}$ is the focal length of the rearward unit, $f_2$ is the local length of the second lens unit G2, and F is the focal length of the entire optical system.

The lens of the invention preferably also satisfies the following expression (2):

$$0.7 < (f_{11} + f_{12})/D_1 < 1.3 \quad (2)$$

where $D_1$ is the principal point interval between the forward unit and the rearward unit as calculated geometical-optically.

GENERAL DISCUSSION OF THE INVENTION

It is necessary that an optical system having the antivibration function be divided into an antivibration optical system and another optical system, because it is necessary to eliminate the aberration dependency of the antivibration optical system and other optical system as much as possible.

When the optical system having the antivibration function is formed into an optical system of short full length by the use of a reflection type lens, it is divided into a reflecting optical system portion (hereinafter referred to as the reflecting portion) and a refracting optical system portion (hereinafter referred to as the refracting portion). In this case, the effective diameter of the refracting portion can be made about ⅓ of the effective diameter of the reflecting portion. Therefore, it is preferable that the refracting portion be the antivibration optical system. It is to be understood here that the reflecting portion is the first lens group G1 and the refracting portion is the second lens group G2. When for example, the telephoto type is adopted to shorten the full length of the optical system, the first lens group G1 has strong positive refractive power.

Due to the necessity of eliminating aberration dependency as previously mentioned, it is necessary to add a refracting optical system to the interior of the reflecting portion, the first lens group G1, to thereby effect aberration correction within the first lens group G1. If the first lens group G1 is divided into a forward unit which is a reflecting portion of positive component and a rearward unit which is a refracting portion of negative component, the first lens group G1 will become capable of effecting good aberration correction mutually by the positive component and the negative component.

If the second lens group G2 (which is the refracting optical system) is disposed on the image plane side of the reflecting optical system, the effective diameter of the second lens group G2 can be made small. Therefore, as noted earlier, it is preferable that the second lens group G2 be the antivibration optical system. Also, the second lens group G2 need have relatively strong refractive power. When the second lens group G2 has negative refractive power, the first lens group G1 must have considerably strong positive refractive power because the entire system has predetermined positive refractive power. As a result, it becomes difficult for the first lens group G1 to effect aberration correction singly. Accordingly, the second lens group G2 should have positive refractive power.

To obtain good aberration of the entire optical system, the aforementioned conditional expression (1) is preferably satisfied:

$$0.7 < (f_{11} \cdot f_2)/(|f_{12}| \cdot F) < 1.3 \quad (1)$$

This will be appreciated from FIGS. 2A-2C of the accompanying drawings. When the focal length $f_{11}$ of the forward unit, the focal length $f_{12}$ of the rearward unit, the focal length $f_2$ of the second lens group G2 and the focal length F of the entire optical system are constant, Fibre 2A shows a case where the first lens group G1 is an afocal system, FIG. 2B shows a case where the first lens group G1 has a strong diverging action, and FIG. 2C shows a case where the first lens group G1 has a converging action.

In other words, FIG. 2A shows a state in which conditional expression (1) is satisfied, FIG. 2B shows the state of the lower limit of conditional expression (1) being exceeded, and FIG. 2C shows the state of the upper limit of conditional expression (1) being exceeded.

When the lower limit of conditional expression (1) is exceeded, the interval between the focal length $f_{11}$ of the forward unit in the first lens group G1 and the focal length $f_{12}$ of the rearward unit in the first lens group G1 widens. Thus, the first lens group G1 comes to have strong negative refractive power. Accordingly, the refractive power of the second lens group G2 as the antivibration optical system becomes strong in the positive direction as compared with the refractive power of the second lens group G2 of FIG. 2A.

As a result, it becomes difficult to effect aberration correction within the second lens group with a small number of lenses. Also, the first lens group G1 has a strong diverging action and therefore, the effective diameter of the second lens group G2 as the antivibration optical system becomes larger, as a shown in FIG. 2B. Correspondingly, the bulk of a holding mechanism 10 for antivibration and drive means 20, shown in the conceptual view of FIG. 3 of the accompanying drawings, will increase.

When conversely, the upper limit of conditional expression (1) is exceeded, as shogun in FIG. 2C, the positive refractive power of the second lens unit G2 becomes weak relative to the case when the first lens unit G1 is an afocal system. Therefore, the back focal length of the entire optical system becomes greater and causes an increase in the overall system length.

As previously described, the first lens group G1 must effect aberration correction. However, the forward unit in the first lens group G1 is a reflecting optical system and therefore basically has little chromatic aberration therein. Therefore, it is preferable to reduce chromatic aberration in the rearward unit in the first lens group G1, in order to reduce the chromatic aberration in the whole of the first lens group G1. Accordingly, it is better to achromatize the rearguard unit by one or more positive lens components and one or more negative lens components.

Also, in order to effect aberration correction in the second lens group G2, it is better to construct the second lens group of one or more positive lens components and one or more negative lens components and to achromatize it.

If the principal point interval between the forward unit and the rearward unit is $D_1$, it is preferable to satisfy the following condition:

$$0.7 < (f_{11} + f_{12})/D_1 < 1.3 \qquad (2)$$

If the upper limit of conditional expression (2) is exceeded, it will be necessary to make the effective diameter of the second lens unit G2 (the antivibration unit) larger because the light flux from the first lens unit G1 will have a strong diverging action. Thus, the bulk of the holding mechanism 10 for antivibration and the drive means 20 will increase.

If conversely, the lower limit of conditional expression (2) is exceeded, it will be necessary to make the amount of correction of the antivibration optical system for antivibration greater. Thus it will become difficult to construct the antivibration optical system with a reduced number of lenses. The effective diameter of the antivibration optical system will also become larger, and the bulk of holding mechanism 10 and the drive means 20 will increase.

To obtain good monochromatic aberration, it is preferable to make the lens component including the concave reflecting surface R1 into a back reflecting mirror and to make the refracting surface into a concave surface. The concave reflecting surface R1 has strong positive refractive power and therefore, monochromatic aberration is liable to occur therein. If, in the order of incidence of light rays, refracting surfaces having negative refractive power are provided immediately forwardly and immediately rearwardly of the refracting surface having strong positive refractive power, the monochromatic aberration by the reflecting surface can be corrected efficiently.

When antivibration is effected, it is better to provide a sufficient space around the second lens group G2 in order that the holding mechanism 10 and the drive means 20 may be disposed around the outer diameter of the second lens group G2. Then, if the surface of the second lens group G2 which is closest to the object side is located more adjacent to the image side in real space than the lens component including the concave reflecting surface R1, so as not to interfere with the first lens group G1 in the direction of the optical axis, there is no barrel structure around the second lens group G2 and the barrel construction including the antivibration mechanism can be simplified.

The rearward unit in the first lens group G1 corrects chromatic aberration. Therefore, if distance adjustment is done by the rearward unit in the first lens group G1, the fluctuation of chromatic aberration can be reduced. Also, the outer diameter of the lens can be made small so that the lens is more lightweight.

It is preferable that the first lens group G1 have a member for limiting the light flux passing to the circumference of the image field and, at the same time, that the minimum effective diameter $\phi_1$ of the second lens group G2 which is the antivibration unit satisfy the following condition:

$$\phi_1 > \phi_0 + 0.004F \qquad (3)$$

where $\phi_0$ is the effective diameter of the second lens group G2 which is determined by the member for limiting the light flux in the first lens group G1, and F is the focal length of the entire optical system.

Because the second lens group G2 effects antivibration by being moved in the direction perpendicular to the optical axis, such a fixed member for limiting the light flux cannot be disposed therein, as a practical matter. If such a member were disposed in the second lens group, the mechanism would become complicated and unsuitable as an antivibration unit. Consequently, the light flux limiting member must be disposed either forwardly or rearwardly of the second lens group G2.

If the light flux limiting member is disposed rearwardly of the second lens group G2, it can only limit the light flux near the outermost circumference of the image field. Consequently, it is preferable that the light flux limiting member be disposed forwardly of the second lens group G2, i.e., in the first lens group G1.

Because the second lens unit G2 is moved perpendicularly to the optical axis, it is also more preferable that the effective diameter thereof be made larger than that when the second lens unit is stationary. If the effective diameter of the second lens unit is determined at all with the second lens unit remaining stationary, asymmetry of the quantity of marginal light will occur when antivibration is effected. Therefore, it is preferable that expression (3) be satisfied.

According to the present invention, there can be provided a lens of short full length with a compact and light-weight antivibration optical system. Further, a space for adding an actuator or the like therein can be secured around the outer diameter of the antivibration optical system, and the rearward unit in the first lens unit G1 which is the focusing unit is compact relative to the forward unit so that the load on the focusing drive system is small.

DESCRIPTION OF THE PREFERRED EMBODIMENT

The forward unit in the first lens group G1 in Embodiment 1 comprises, in order of light incidence, a biconvex positive lens L1, a back mirror L2 having a concave reflecting surface R1 and a refracting surface of negative refractive power, a back mirror L3 having a convex reflecting surface R2 and a refracting surface of positive refractive power, a cemented lens comprising a positive lens L4 and a negative lens L5 and being a positive component as a whole. The rearward unit comprises, in order of light incidence, a cemented lens comprising a positive lens L6 and a negative lens L7 and being a negative component as a whole, and a biconcave negative lens L8. The second lens group G2 comprises, in order of light incidence, a biconvex positive lens L9, a negative meniscus lens L10 having its convex surface facing the object side, a biconvex positive lens L11 and a negative meniscus lens L12 having its concave surface facing the object side.

The rearward unit in the first lens group G1 is a focusing unit and, in the form shown, is located more adjacent to the object side in real space than the concave reflecting surface R1. However, it is also effective to dispose the rearward unit more adjacent to the image side in real space than the concave reflecting surface R1 in order to simplify the barrel structure.

As another variant more similar to the illustrative form, it is effective to dispose the rearward unit more adjacent to the object side than the back mirror L2 including the concave reflecting surface R1.

Figure 1:
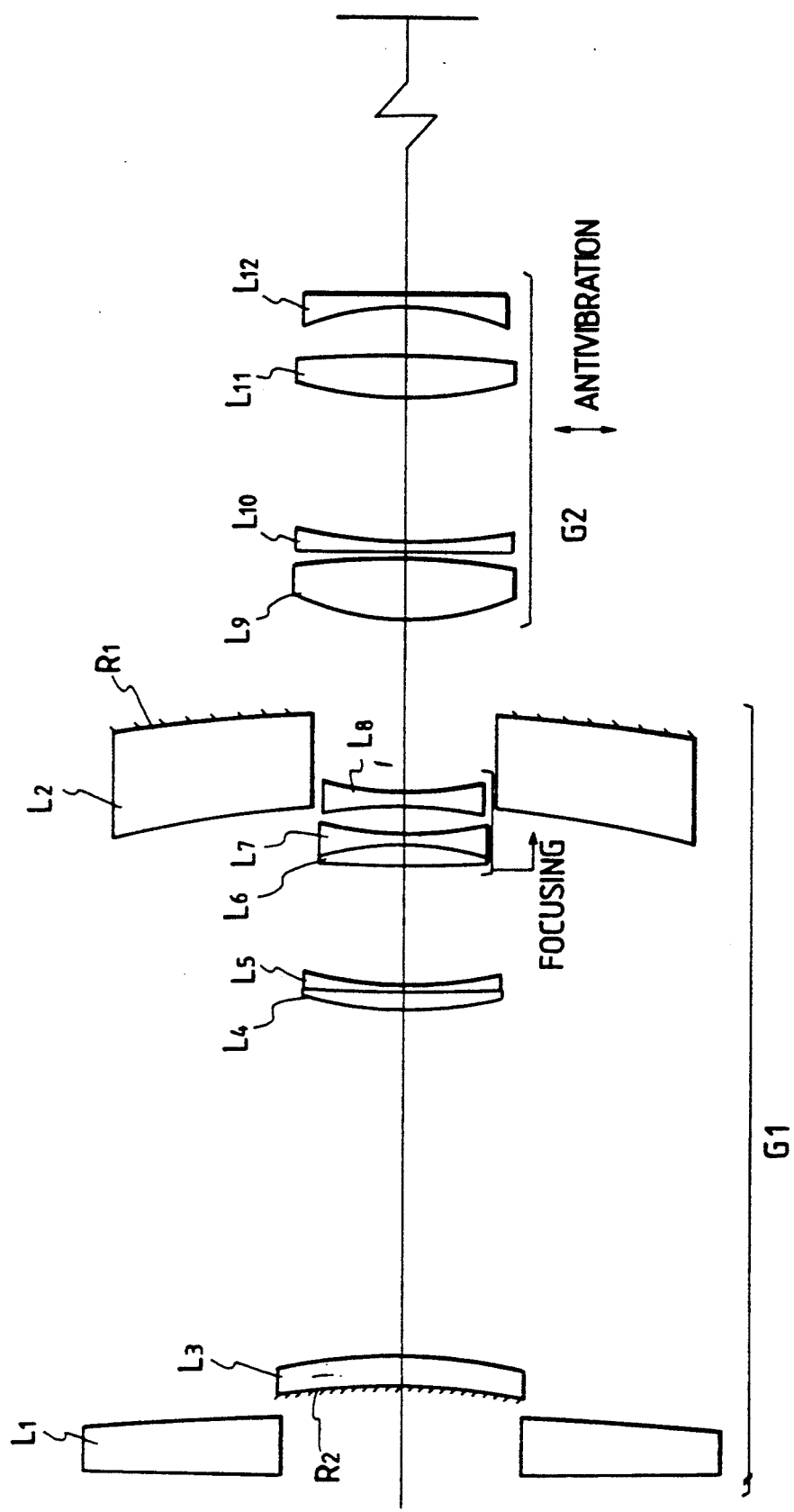
FIG. 1 shows the construction of a lens according to Embodiment 1 of the present invention.
Figure 2A:
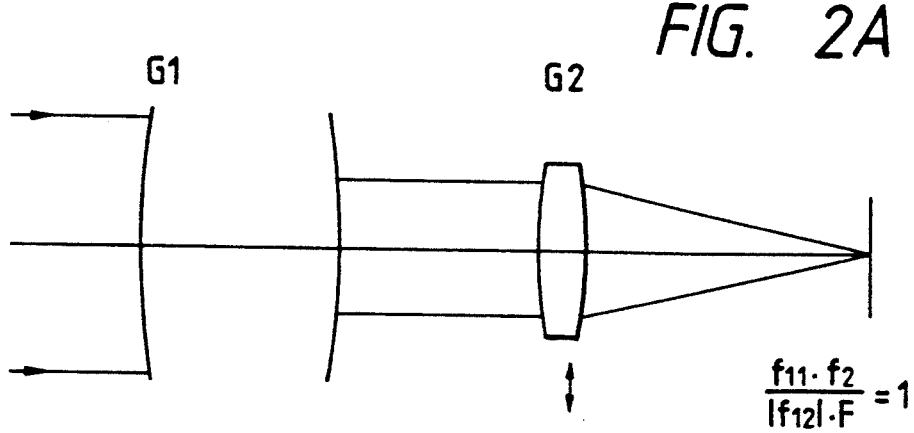
FIGS. 2A-2C show the principle of the present invention, FIG. 2A showing a state in which the first lens group G1 is afocal, FIG. 2B showing a state in which the first lens group G1 has strong negative refractive power, and FIG. 2C showing a state in which the first lens group G1 has strong positive refractive power.
Figure 2B:
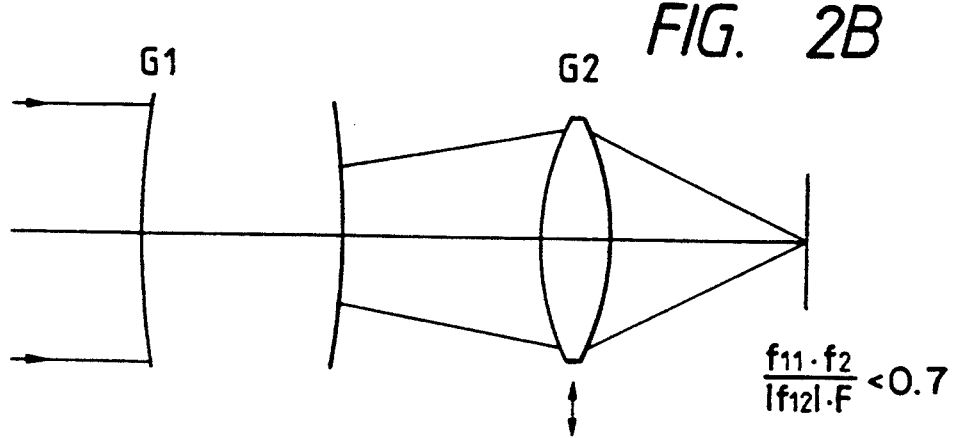
Figure 2C:
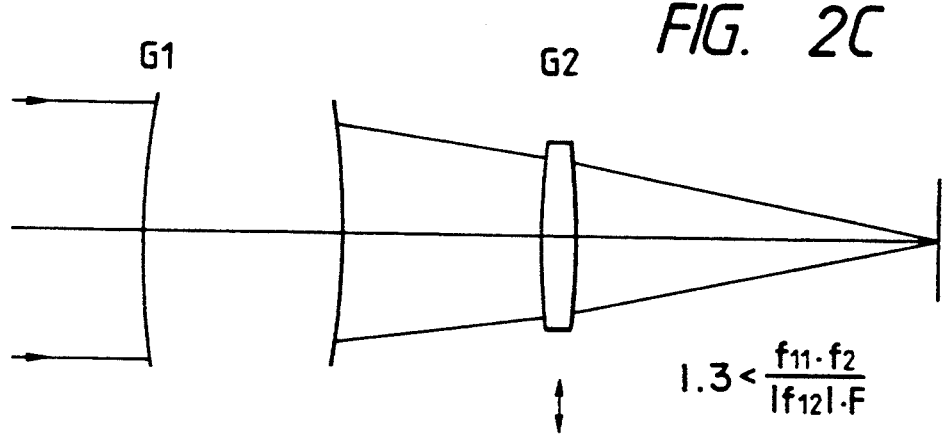
Figure 3:
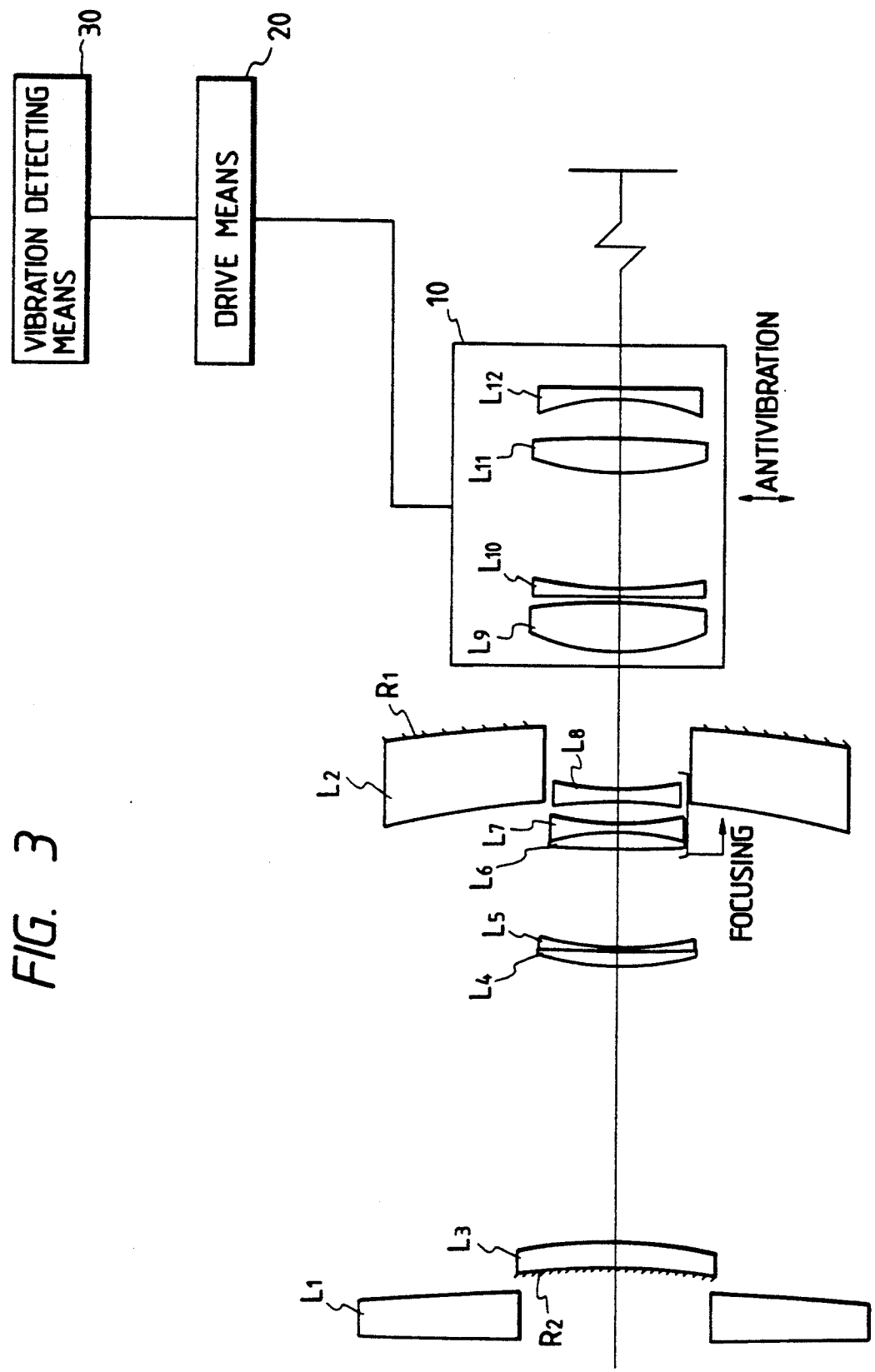
FIG. 3 is a conceptual view of the embodiment of the present invention.

As shown in FIG. 1, the surface of the second lens group G2 which is closest to the object side is located more adjacent to the image side than the concave reflecting surface R1 It is moved by maximum 2 mm in a direction perpendicular to the optical axis to thereby obtain an antivibration effect.

The focusing of the present embodiment is effected by the rearward unit in the first lens group G1, but alternatively may be effected by moving the first lens group G1 and the second lens group G2 independently of each other or together with each other. As a further alternative, the focusing may be effected by moving the positive lens L1, which is the lens component of the first lens group G1 most adjacent to the object side, or by moving this positive lens L1 and the back mirror L3 having the reflecting surface R2 together with each other.

The reflecting mirror referred to herein may be a surface reflecting mirror or a back reflecting mirror. The aforementioned light flux limiting member is a fixed stop, or may be any member having the function thereof.

Drive means 20 moves the second lens unit G2 by a signal from vibration detecting means 30 for detecting vibration by a sensor, not show, thereby correcting the displacement of an image.

Numerical values of the embodiment of the present invention are given below. In the table below, the numbers at the left side represent the order of light incidence, r represents the radius of curvature of each lens surface, d represents the spacing between adjacent lens surfaces, and the refractive index n and the Abbe number $\nu$ are values for d line ($\lambda=587.6$ nm). F is the focal length of the entire system, $f_{11}$ is the focal length of the forward unit in the first lens group G1, $f_{12}$ is the focal length of the rearward unit, $f_2$ is the focal length of the second lens group G2, $D_1$ is the principal point interval between the forward unit and rearward unit in the first lens group G1, and $D_2$ is the principal point interval between the rearward unit in the first lens group G1 and the second lens group G2.

TABLE 1

Numerical values of Embodiment 1

F = 1000; $f_{11}$ = +362.87; $f_{12}$ = −50.00; $f_2$ = 137.79
$D_1$ = +312.87; $D_2$ = −5.538
Amount of shift of the second lens unit: −2∼+2 mm
Amount of correction of the image: −2∼+2 mm

|    | r         | d        | $\nu$  | n        |
|----|-----------|----------|--------|----------|
| 1  | 3852.629  | 10.00    | 64.1   | 1.51680  |
| 2  | −600.129  | 98.15    |        |          |
| 3  | −193.805  | 15.00    | 64.1   | 1.51680  |
| 4  | −308.911  | −15.00   |        | −1.51680 |
| 5  | −193.805  | −88.62   |        | −1.00000 |
| 6  | −95.384   | −5.00    |        | −1.51680 |
| 7  | −147.390  | 5.00     | 64.1   | 1.51680  |
| 8  | −95.384   | 55.46    |        |          |
| 9  | 67.315    | 3.00     | 57.5   | 1.67025  |
| 10 | 342.737   | 1.00     | 35.5   | 1.59507  |
| 11 | 81.961    | 19.3147  |        |          |
| 12 | 206.961   | 3.35     | 28.6   | 1.79504  |
| 13 | −58.971   | 1.70     | 54.0   | 1.61720  |
| 14 | 64.912    | 4.50     |        |          |
| 15 | −82.882   | 2.25     | 54.0   | 1.61720  |
| 16 | 62.151    | 27.9340  |        |          |
| 17 | 47.249    | 10.00    | 70.4   | 1.48749  |
| 18 | −128.313  | 1.10     |        |          |
| 19 | 1695.933  | 1.70     | 25.4   | 1.80518  |
| 20 | 99.259    | 23.50    |        |          |
| 21 | 69.608    | 7.00     | 35.5   | 1.59507  |
| 22 | −196.505  | 7.90     |        |          |
| 23 | −46.428   | 2.25     | 50.2   | 1.72000  |
| 24 | −681.822  | 75.7409  |        |          |

(Numerical values corresponding to conditions)
(1) $(f_{11} \cdot f_2)/(|f_{12}| \cdot F) = 1.00$
(2) $(f_{11} + f_{12})/D_1 = 1.00$ In the present invention, aberrations are corrected well.

What is claimed is:

1. A reflex lens system including in order of light incident;
   a first lens group having a positive forward unit and a negative rearward unit and constituting a substantially afocal system as a whole;
   a second lens group of positive refractive power;
   said forward unit in said first lens group having, in order of light incidence, a concave reflecting surface and a convex reflecting surface; and
   means for displacing at least a part of said second lens group across the optical axis to effect antivibration of an image.

2. A reflex lens system according to claim 1, which satisfies the following condition:

$$0.7 < (f_{11} \cdot f_2)/(|f_{12}| \cdot F) < 1.3 \qquad (1)$$

where $f_{11}$ is the focal length of said forward unit, $f_{12}$ is the focal length of said rearward unit, $f_2$ is the focal length of said second lens group, and F is the focal length of the entire optical system.

3. A reflex lens system according to claim 1, wherein each of said rearward unit and said second lens group each comprises one or more positive lens components and one or more negative lens components.

4. A reflex lens system according to claim 1, which satisfies the following condition:

$$0.7<(f_{11}+f_{12})/D_1<1.3 \qquad (2)$$

where $f_{11}$ is the focal length of said forward unit, $f_{12}$ is the focal length of said rearward unit, and $D_1$ is the principal point interval between said forward unit and said rearward unit as calculated geometrical optically.

5. A reflex lens system according to claim 1, wherein said concave reflecting surface is an image side back reflecting mirror of a meniscus lens which has a refracting surface with negative refractive power.

6. A reflex lens system according to claim 1, wherein a surface of said second lens group which is closest to the object side is located more adjacent to the image side in real space than a lens component including said concave reflecting surface.

7. A reflex lens system according to claim 1, wherein said rearward unit is movable on the optical axis to effect focusing.

8. A reflex lens system according to claim 1, wherein said first lens group has a light flux limiting member.

9. A reflex lens system according to claim 8, which satisfies the following condition:

$$\phi_1>\phi_0+0.004F \qquad (3)$$

where $\phi_1$ is the minimum effective diameter of said second lens group, $\phi_0$ is the effective diameter of said second lens group determined by said light flux limiting member, and F is the focal length of the entire optical system.

* * * * *